(12) United States Patent
Guillot et al.

(10) Patent No.: US 11,372,265 B2
(45) Date of Patent: Jun. 28, 2022

(54) OPTICAL LENS

(71) Applicant: Essilor International, Charenton-le-Pont (FR)

(72) Inventors: Matthieu Guillot, Charenton-le-Pont (FR); Helene Guillou, Charenton-le-Pont (FR); Carlos Rego, Charenton-le-Pont (FR); Eric Gacoin, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 16/959,349

(22) PCT Filed: Oct. 16, 2019

(86) PCT No.: PCT/EP2019/078128
§ 371 (c)(1),
(2) Date: Jun. 30, 2020

(87) PCT Pub. No.: WO2020/079105
PCT Pub. Date: Apr. 23, 2020

(65) Prior Publication Data
US 2021/0373357 A1    Dec. 2, 2021

(30) Foreign Application Priority Data

Oct. 16, 2018    (EP) .................................... 18306358

(51) Int. Cl.
*G02C 7/02*    (2006.01)
*B29D 11/00*    (2006.01)

(52) U.S. Cl.
CPC ........ *G02C 7/027* (2013.01); *B29D 11/00201* (2013.01); *B29D 11/00961* (2013.01);
(Continued)

(58) Field of Classification Search
CPC .... G02C 7/027; G02C 7/028; G02C 2202/24; G02C 7/022; G02C 7/00; G02B 1/10;
(Continued)

(56) References Cited

U.S. PATENT DOCUMENTS

2008/0269886 A1\* 10/2008 Simpson ................ A61F 2/1613
                                                                     623/6.25
2016/0306192 A1    10/2016 Marshall et al.
(Continued)

OTHER PUBLICATIONS

International Search Report and Written Opinion dated Feb. 12, 2020 in PCT/EP2019/078128 filed on Oct. 16, 2019.

*Primary Examiner* — Tuyen Tra
(74) *Attorney, Agent, or Firm* — Oblon, McClelland, Maier & Neustadt, L.L.P.

(57) ABSTRACT

A lens element adapted for a person including a holder including a refraction area having a refractive power based on a prescription for correcting an abnormal refraction of the person, a plurality of optical elements placed on at least one surface of the holder to at least one of: slow down, retard, or prevent a progress of the abnormal refraction of an eye of the person, and at least one layer of at least one coating element covering at least a zone of at least one optical element and at least a zone of the holder on which the optical elements are placed, wherein said at least one layer of at least one coating element adds an optical power of 0.1 diopter in absolute value in specific wearing conditions when measured over said zone of the optical element covered by said at least one layer of at least one coating element.

1 Claim, 5 Drawing Sheets

(52) U.S. Cl.
CPC ........ *G02C 7/028* (2013.01); *B29D 11/00528* (2013.01); *B29D 11/00884* (2013.01); *G02C 2202/24* (2013.01)

(58) Field of Classification Search
CPC ........ B29D 11/00201; B29D 11/00961; B29D 11/00528; B29D 11/00884; B29D 11/00009; B29D 11/00326; B29D 11/00865
USPC .................... 351/41, 159.01, 159.73, 159.74
See application file for complete search history.

(56) References Cited

U.S. PATENT DOCUMENTS

| | | |
|---|---|---|
| 2017/0131567 A1 | 5/2017 | To et al. |
| 2017/0184875 A1* | 6/2017 | Newman .......... B29D 11/00326 |
| 2019/0212580 A1 | 7/2019 | To et al. |
| 2019/0324293 A1 | 10/2019 | Marshall et al. |
| 2020/0012123 A1 | 1/2020 | Newman |
| 2020/0241325 A1* | 7/2020 | Chalberg ......... B29D 11/00048 |

* cited by examiner

OPTICAL LENS

FIELD OF THE INVENTION

The disclosure relates to a method implemented by computer means for determining a lens element. The disclosure also relates to methods implemented by computer means for determining transfer laws associated with a coating process of a lens element.

Additionally, the disclosure relates to a lens element intended to be worn in front of an eye of a person to slow down and/or prevent a progression of abnormal refractions of the eye such as myopia or hyperopia.

Furthermore, the disclosure relates to a method implemented by computer means for determining a mold for a lens element.

Additionally, the disclosure relates to a mold for a lens element a plurality of optical elements having a targeted optical function and intended to be covered by at least one layer of at least one coating element.

BACKGROUND OF THE INVENTION

Myopia of an eye is characterized by the fact that the eye focuses distant objects in front of its retina, hypermetropia is characterized by the fact that the eye focuses distant objects behind of its retina. Myopia is usually corrected using a concave lens providing negative dioptric power and hypermetropia is usually corrected using a convex lens providing positive dioptric power.

It has been observed that some individuals when corrected using conventional single vision optical lenses, in particular children, focus inaccurately when they observe an object which is situated at a short distance away, that is to say, in near vision conditions. Because of this focusing defect on the part of a myopic child which is corrected for his far vision, the image of an object close by is also formed behind his retina, even in the foveal area.

Such focusing defect may have an impact on the progression of myopia of such individuals. One may observe that for most of said individual the myopia defect tends to increase over time partly caused by long and intensive near work sessions.

In particular, studies carried out on monkeys have shown that strong defocusing of the light behind the retina, which occurs away from the foveal zone, may cause the eye to extend and therefore may cause a myopia defect to increase.

Optical lenses usually undergo numerous treatments adding multiple properties to the lenses. For example, the use of anti-scratch and anti-reflective treatments have become commonplace. Such treatments mostly correspond to an application of a coating layer on a surface of the optical lens, adding specific properties to said covered surface.

However, the use of classic treating methods is rendered difficult for lenses having complex designs, such as the recently developed optical lenses comprising optical elements placed on its surface to prevent, or at least slow down, the progression of abnormal refractions of an eye such as myopia or hyperopia.

Indeed, the thickness of the coating layer usually used to treat the surfaces of a lens is not negligible when compared to the size of optical elements placed on said surface. For example, the index of refraction of the coating layer covering optical elements may impact the light ray transmission and thus modify the optical function of said optical elements. Even a slight thickness heterogeneity of the coating layer covering the optical elements may modify the optical function of said optical elements.

Therefore there is a need to provide a method to determine a lens element comprising optical elements to prevent or at least slow down the progression of the abnormal refraction of the eye that would compensate and correct the modification of the lens element properties induced by a treatment of said lens element.

Additionally, there is a need to provide a method to determine a mold for lens element comprising optical elements to prevent or at least slow down the progression of abnormal refraction of the eye of the wearer that would compensate and correct the modification of the lens element properties induced by a treatment of said lens element.

SUMMARY OF THE INVENTION

To this end, the invention proposes a method for example, implemented by computer means for determining a lens element, the lens element comprising:

a holder comprising a refraction area having a first refractive power;

a plurality of optical elements placed on at least one surface of the holder, the plurality of optical elements having a second refractive power that differs from the first refractive power of the holder; and at least one layer of at least one coating element covering at least a zone of at least one optical elements and at least a zone of the holder on which the optical elements are placed, wherein the method comprises:

providing lens data, the lens data indicating at least a shape of the lens element to be determined, the shape of the lens element corresponding to a shape of the holder and to at least a shape of the optical elements of the lens element, the shape of the optical elements being associated with a targeted optical function;

providing a coating lens transfer law associated with a coating process of a lens element comprising the optical elements, the coating process being associated with the coating element, the coating lens transfer law corresponding to transformations to apply to the shape of the surface of the lens element comprising the optical elements for compensating modifications of the targeted optical function of said optical elements induced by the coating process; and determining the lens element, for example adapted for the wearer, based at least on the lens data and the coating lens transfer law.

Advantageously, determining the lens element based on the lens data and the coating lens transfer law allows tuning the design of the uncovered lens element in order to obtain an accurate treated lens element having a targeted optical function, for example adapted for a wearer once covered by the coating layer.

According to further embodiments which can be considered alone or in combination:

the method further comprises manufacturing a lens element based on the determined lens element, for example adapted for a wearer; and/or the method further comprises coating at least a zone of the surface and at least a zone of the at least one optical element with at least one coating element based on the coating process.

The disclosure further relates to a method implemented by computer means for determining a transfer law associated with a coating process of a lens element, the method comprising:

providing a lens element, the lens element comprising:
a holder comprising a refraction area having a first refractive power,
at least one optical element having at least one targeted optical function and placed on at least one surface of the holder, the at least one targeted optical function being different from the first refractive power,
coating at least a zone of the holder and at least a zone of at least one optical element with at least one coating element based on a coating process, the coating process being associated with the at least one coating element;
measuring at least one optical characteristic of at least a zone of the at least one optical element covered by the coating element;
determining at least one optical characteristic error based on a comparison of the measured at least one optical characteristic of the coated optical element and the at least one targeted optical function;
compiling information corresponding to the determined optical characteristic error into database as correction information;
determining a transfer law associated with the coating process and the at least one optical element based on the correction information of the database, the transfer law correcting an original shape of the surface of the lens element comprising the at least one optical element so that once coated by the at least one coating element, said at least one coated optical element reaches a targeted optical function.

According to further embodiments which can be considered alone or in combination:
the method comprises, prior to the measuring step, a step of polymerizing the at least one coating element covering a zone of the holder and at least a zone of at least one optical element; and/or
the method comprises, further to the coating step, a second step of coating at least a zone of the holder and at least a zone of at least one optical element with at least one coating element based on a coating process, the coating process being associated with the at least one coating element; and/or
the at least one coating element comprises anti-abrasion features; and/or
the method comprises a step S30a of providing a mold for a lens element a person and a step S30b of obtaining a lens element a person by molding it; and/or
the transfer law is a coating lens transfer law for correcting an original shape of the surface of the lens element comprising the at least one optical element so that once coated by the at least one coating element, said at least one coated optical element reaches a targeted optical function and/or
the transfer law is a coating mold transfer law for correcting an original shape of a surface of the mold for a lens element comprising at least one surfacic element corresponding to the at least one optical element so that once molded and coated by the at least one coating element, the at least one coated optical element of the molded and coated lens reaches a targeted optical function.

Another aspect of the disclosure relates to a lens element, for example adapted for a person, and comprising:
a holder comprising a refraction area having a refractive power based on a prescription for correcting an abnormal refraction of the person;
a plurality of optical elements placed on at least one surface of the holder so as to at least one of slow down, retard or prevent a progress of the abnormal refraction of the eye of the person; and
at least one layer of at least one coating element covering at least a zone of at least one optical element and at least a zone of the holder on which the optical elements are placed, wherein said at least one layer of at least one coating element adds an optical power of 0.1 diopter in absolute value in specific wearing conditions when measured over said zone of the optical element covered by said at least one layer of at least one coating element.

Advantageously, having the at least one layer of at least one coating element participating to the optical power of the optical element allows obtaining a lens element comprising coated optical elements with a specific targeted optical function as well as specific treatments. In other words, the at least one layer of at least one coating element participates to the optical function of the coated optical element while providing specific features associated with the coating process of a treatment.

According to further embodiments which can be considered alone or in combination:
the specific wearing condition corresponds to the standard wearing condition; and/or
the abnormal refraction of the eye is myopia; and/or
the at least one layer of a coating element covering at least one optical element is thicker at the periphery of a surface of said coated optical elements; and/or
the at least one layer of coating element covering at least one optical element is thicker at the center of a surface of said coated optical elements than at the edge of the surface of said coated optical elements; and/or
at least a part of the plurality of optical elements are placed on at least a ring on the at least one surface of the holder; and/or
the plurality of optical elements are placed on concentric rings on the at least one surface of the holder; and/or
the mean sphere of all the coated optical elements placed on a concentric ring is identical; and/or
the mean sphere of at least part of the coated optical elements varies from the center to the edge of the lens element; and/or
the mean sphere of at least part of the coated optical elements decreases from the center to the edge of the lens element; and/or
the mean sphere of at least part of the coated optical elements increases from the center to the edge of the lens element; and/or
at least part of the optical elements are contiguous.

Another aspect of the disclosure relates to a method implemented by computer means for determining a mold for a lens element and comprising
a holder comprising a refraction area having a refractive power;
a plurality of optical elements placed on at least one surface of the holder and having a targeted refractive power different from the first refractive power of the holder; and
wherein at least a zone of at least one optical elements and at least a zone of the holder on which the optical elements are placed are intended to be covered by at least one layer of at least one coating element,
wherein the method comprises:
providing mold data indicating at least an initial shape of the mold, the initial shape of the mold corresponding to a shape of the surface of the holder and to at least a shape of the optical elements of the lens element, the shape of the optical elements being associated with the targeted optical function;

providing a coating mold transfer law associated with a coating process of a lens element comprising the optical elements, the coating process being associated with the coating element, the coating mold transfer law corresponding to transformations to apply to the shape of the mold for compensating modifications of the targeted optical function of said optical elements induced by the coating process; and determining a shape of the mold for a lens element based at least on the mold data and the coating mold transfer law.

Advantageously, determining a mold for a lens element based on the mold data and the coating mold transfer law allows tuning the design of the mold to easily produce a large number of uncovered lens element in order to obtain an accurate treated lens element, for example adapted for a wearer once covered by the coating layer.

According to further embodiments which can be considered alone or in combination:

the method further comprises providing a cooling transfer law associated with a cooling process of a molded lens element comprising optical elements, the cooling transfer law corresponding to transformations to apply to the shape of the mold for compensating modifications of the targeted optical function of said optical elements induced by the retraction of the lens element material during the cooling process, wherein the shape of the mold for a lens element is determined based on the mold data, the coating mold transfer law and the cooling transfer law.

The disclosure further relates to a mold for a lens element comprising a plurality of optical elements having a targeted optical function and intended to be covered by at least one layer of at least one coating element, comprising:

a first molding element having a first surface, the first surface having a first surfacic curvature and comprising a plurality of surfacic elements having at least a second surfacic curvature that differs from the first, a second molding element having a second surface, a gasket having an inner and an outer surfaces, wherein the first surface of the first molding element, the second surface of the second element and the inner surface of the gasket form a molding cavity in which a molding material is to be filled.

According to further embodiments which can be considered alone or in combination:

the gasket comprises an opening through which the molding material is injected in the molding cavity; and/or the molding material is a thermo-plastic material injected in the molding cavity; and/or the molding material is a casting material casted into the molding cavity and polymerized; and/or at least part, for example 50%, preferably 80%, more preferably all the surfacic elements of the plurality of surfacic elements present an axis of symmetry (Di); and/or the plurality of surfacic elements have a contour shape being inscribable in a circle (C) having a diameter greater than or equal to 0.8 mm and smaller than or equal to 3.0 mm; and/or the axis of symmetry (Di) of the surfacic elements is also the center of the corresponding circle (C); and/or the mean surfacic curvature of the surfacic element in a central zone of the surfacic element is different from the mean surfacic curvature of the surfacic element in a peripheral zone of the surfacic element, the central zone of the surfacic element corresponding to a circular zone comprised in the circle (C), having the same center as said circle (C) and a radius equal to 0.75 times the radius of the circle (C), the peripheral zone of the surfacic element corresponding to the concentric ring of the circle (C) distant by at least 0.75 times the radius of the surface of the surfacic element; and/or along a section of the surfacic element passing through the intersection point between the axis of symmetry (Di) of said surfacic element and said surfacic element, the surfacic curvature of the surfacic element increases along the section from said intersection to a first point and decreases from the first point to the periphery of the section; and/or at least two of the plurality of surfacic elements are non-contiguous; and/or at least two of the plurality of surfacic elements are contiguous; and/or the plurality of surfacic elements are positioned on a structured network; and/or the plurality of surfacic elements are positioned along a plurality of concentric rings; and/or the surfacic curvature of the surfacic elements placed on the same concentric ring are identical the plurality concentric rings of surfacic elements are centered on the geometric center of the first surface of the first molding element; and/or along at least one section of the first molding element, the surfacic curvature of the plurality of surfacic elements increases from a point of said section towards the peripheral part of said section; and/or along at least one section of the first molding element passing through a geometric center of the first surface of said molding element, the surfacic curvature of the plurality of surfacic elements increases from said geometric center towards the peripheral part of said section; and/or along at least one section of the first molding element, the surfacic curvature of the plurality of surfacic elements increases from a first point of said section towards the peripheral part of said section and decreases from a second point of said section towards the peripheral part of said section, the second point being closer to the peripheral part of said section than the first point; and/or for every circular zone having a radius comprised between 4 and 8 mm and comprising a geometrical center of the first surface of the first molding element greater than or equal to said radius+5 mm, the ratio between the sum of areas of the parts of the plurality of surfacic elements located inside said circular zone and the area of said circular zone is comprised between 20% and 70%.

BRIEF DESCRIPTION OF THE DRAWINGS

Embodiments of the invention will now be described, by way of example only, and with reference to the following drawings in which.

Elements in the figures are illustrated for simplicity and clarity and have not necessarily been drawn to scale. For example, the dimensions of some of the elements in the figure may be exaggerated relative to other elements to help to improve the understanding of the embodiments of the present disclosure.

DETAILED DESCRIPTION OF EMBODIMENTS OF THE INVENTION

The disclosure relates to a method for determining a lens element, for example adapted for a wearer.

In the context of the present disclosure, the term "lens element" can refer to lens blank having a finished face and an unfinished face where the unfinished is intended to be surfaced to provide an uncut optical lens, an uncut optical lens or a spectacle optical lens edged to fit a specific spectacle frame or an ophthalmic lens.

The lens element according to the disclosure is described as being adapted for a person and intended to be worn in front of an eye of said person to prevent or at least slow down a progression of abnormal refractions of the eye such as myopia or hyperopia. However, it will appears clearly to the person skilled in the art that the lens element may have any optical function, for example an optical function not adapted to the wearer.

Figure 1:
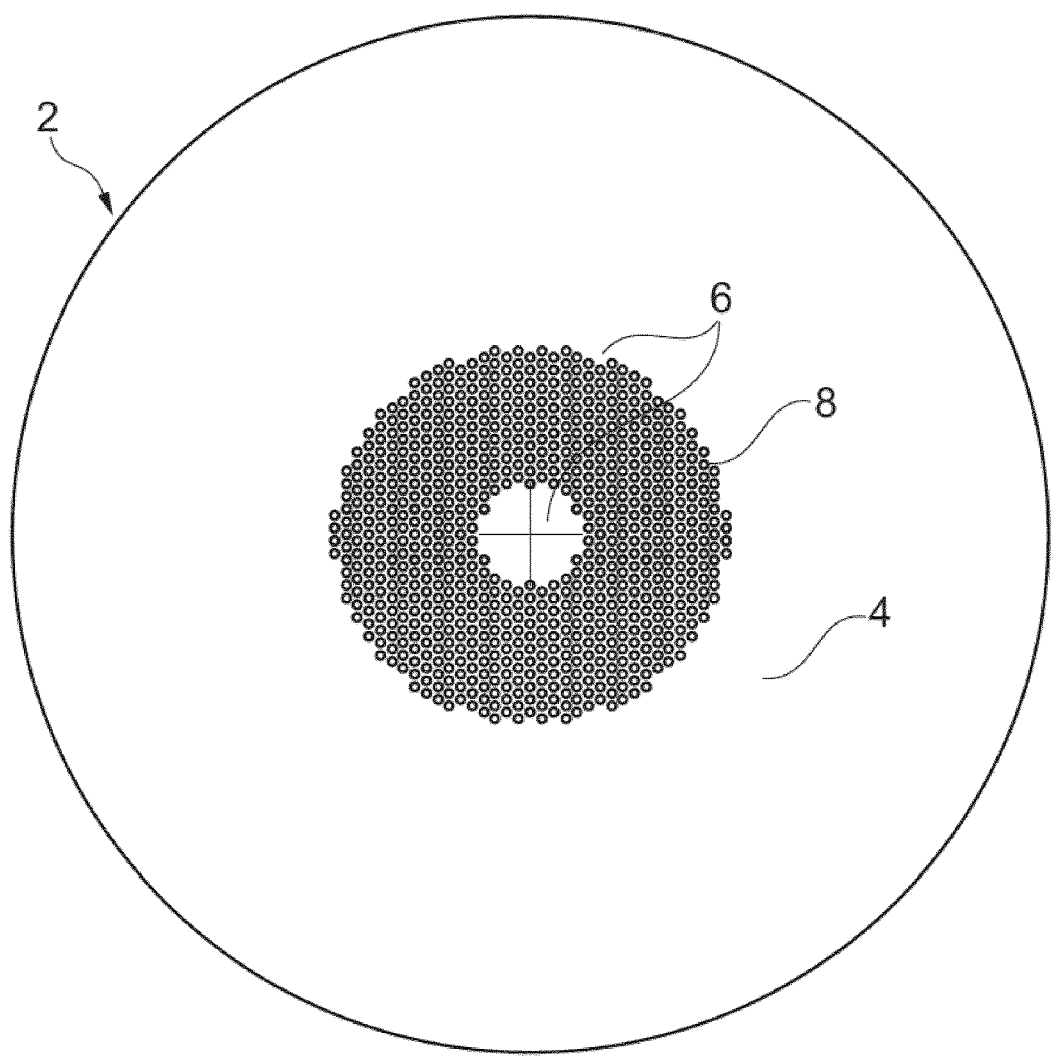
FIG. 1 illustrates a plan view of a lens element according to an embodiment of the disclosure.

As illustrated on FIG. 1, the lens element 2 according to the disclosure comprises a holder 4 having a refraction area 6 and a plurality of optical elements 8 placed on at least one surface of said holder.

The holder 4 is, for example, made of polycarbonate material.

The refraction area 6 has a first refractive power, for example based on the prescription of the eye of the person. The prescription is adapted for correcting the abnormal refraction of the eye of the person.

The term "prescription" is to be understood to mean a set of optical characteristics of optical power, of astigmatism, of prismatic deviation, determined by an ophthalmologist or optometrist in order to correct the vision defects of the eye, for example by means of a lens positioned in front of his eye. For example, the prescription for a myopic eye comprises the values of optical power and of astigmatism with an axis for the distance vision.

For example, the shape of a refraction area 6 is spherical. The shape of the other face is configured so that the refraction area has an optical function of focusing an image on the retina.

For example the shape of said second face is spherotorical. Advantageously, the shape of said second face is aspherical and calculated by an optical optimization such that every light beam incident on the refraction area 6 is focused on the retina of the wearer when the lens is worn.

The refraction area 6 is preferably formed by the area not covered by any optical element of the plurality of optical elements 8. In other words, the refractive area is the complementary area to the areas formed by the plurality of optical elements 8.

According to different embodiments of the disclosure, the abnormal refraction of the eye is myopia, hyperopia or astigmatism.

The lens element 2 according to the disclosure further comprises a plurality of optical elements 8. The optical elements 8 are placed on at least one surface of the holder 4. Preferably, the optical elements 8 are placed on the front face of the lens element 2. The front face of the lens element 2, or "object side" face, corresponds to the face of the lens element which is not facing the eye of the person.

In the sense of the disclosure, the term "plurality of" is to be understood as "at least three".

At least one optical element of the plurality of optical elements 8 has a second optical function, for example an optical function of not focusing an image on the retina of the eye of the wearer. In other words, at least one optical element of the plurality of optical elements 8 has an optical function of focusing an image in front of and/or behind the retina of the wearer.

When the abnormal refraction of the eye of the person corresponds to myopia the optical elements 8 have an optical function of focusing an image in front of the retina of the eye of the wearer when worn by the wearer.

When the abnormal refraction of the eye of the person corresponds to hypermetropia the optical elements 8 have an optical function of focusing an image behind the retina of the eye of the wearer when worn by the wearer.

Preferably, at least 30%, for example at least 80%, for example all, of the optical elements have an optical function of focusing an image on a position other than the retina.

In the sense of the disclosure "focusing" is to be understood as producing a focusing spot with a circular section that can be reduced to a point in the focal plane.

Advantageously, such optical function of the optical element produces an optical signal that inhibits the deformation of the retina of the eye of the wearer, allowing to prevent or at least slow down the progression of the abnormal refraction of the eye of the person wearing the lens element 2.

Figure 2:
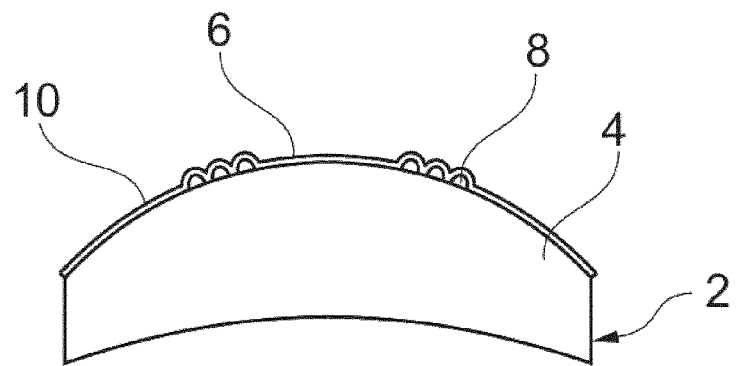
FIG. 2 illustrates a general profile of a lens element according to an embodiment of the disclosure.

As represented on FIG. 2, the lens element 2 comprises at least one layer 10 of at least one coating element. The at least one layer 10 of at least one coating element covers at least a zone of at least one optical element 8 and at least a zone of the holder 4 on which the optical elements are placed.

The at least one layer 10 of at least one coating element may be characterized by different parameters such as an index of refraction and a thickness. The coating layer 10 is also defined by a coating process characterized by different parameters such as for example the curing time or the temperature and/or viscosity of the coating element during the coating operations.

The at least one layer 10 of at least one coating element is characterized by a refractive index and a local thickness, and thus participates to the optical function of the optical elements.

Moreover, when the at least one layer 10 of at least one coating element is applied on the lens element, the viscosity of the at least one coating element combined with the complex shape of the surface of the lens element comprising the plurality of optical elements may result in a non-homogenous repartition of said at least one coating element over the surface of the lens element.

Figures 4, 5, 6:
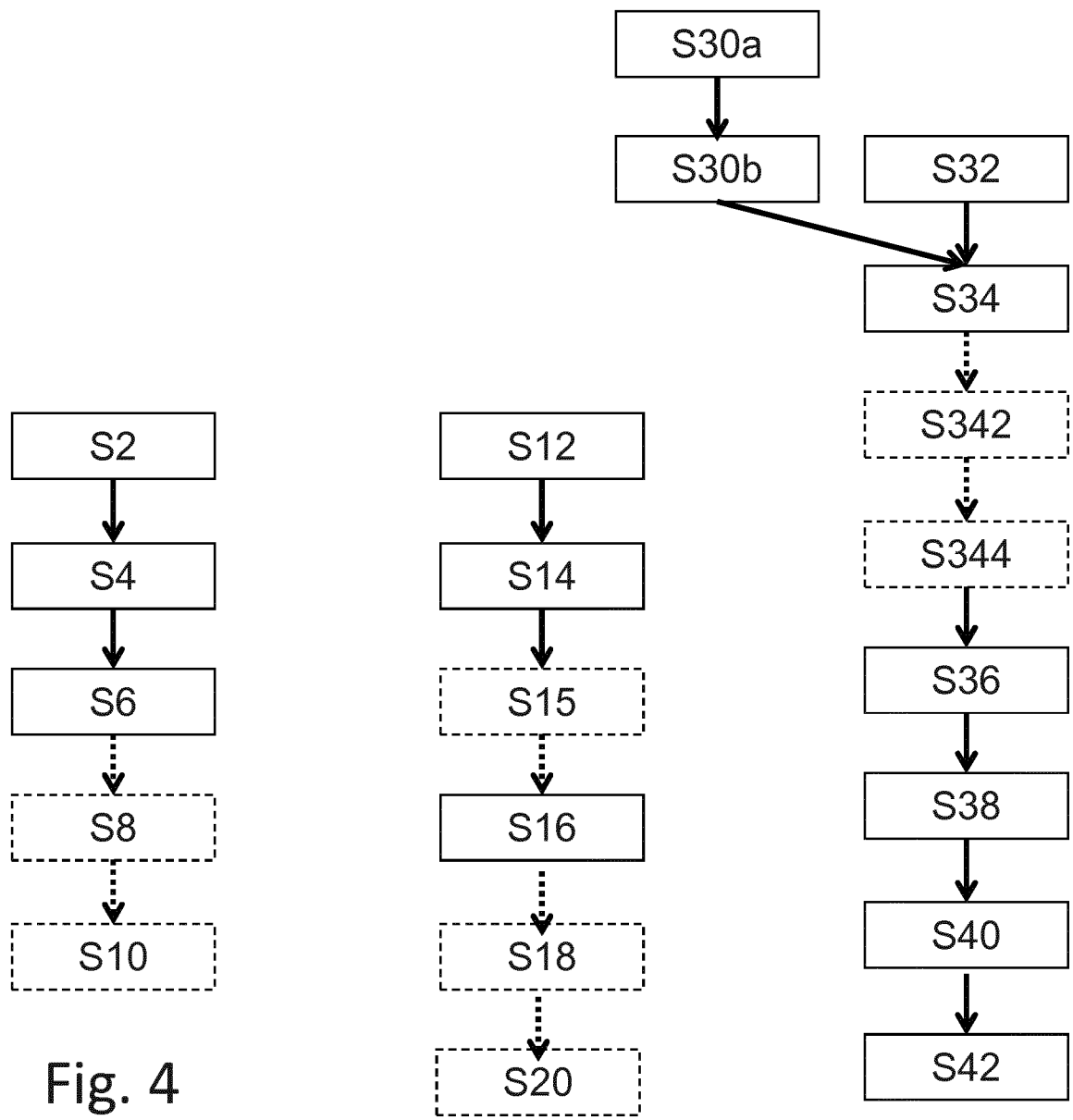
FIG. 4 illustrates a chart-flow embodiment of the method for determining a lens element according to the disclosure.
FIG. 5 illustrates a chart-flow embodiment of the method for determining a mold for a lens element according to the disclosure.
FIG. 6 illustrates a chart-flow embodiment of the method for determining a transfer law associated with a coating process of a surface of a lens element according to the disclosure.

As illustrated on FIG. 4, the method for determining a lens according to the disclosure comprises a step S2 of providing lens data. The lens data indicates at least the shape of the lens element to be determined.

The shape of the lens element corresponds to a shape of the holder, and to at least a shape of the optical elements of the lens element to be determined. The shape of the holder is associated with the prescription for correcting the abnormal refraction of the eye of the person. The shape of the optical elements is associated with a target optical function of said optical elements.

The method for determining a lens element according to the disclosure further comprises a step S4 of providing a coating lens transfer law associated with a coating process of the lens element comprising the optical elements. The coating process is associated with at least one coating element.

The coating process may further relate to the shape of the surface of the lens element bearing the optical elements 8, the shape of the optical elements, a targeted thickness of the at least one coating layer 10 of at least one coating element, and the conditions of application of the at least one coating element.

For example, the conditions of application of the at least one coating element may relate to the withdrawal speed for a dip-coating type process or the rotation speed for spin-coating. The conditions of application may also relate to drying parameters.

The coating lens transfer law corresponds to transformations to apply to the shape of the surface of the lens element comprising the optical elements 8 for compensating modifications of the targeted optical function of the optical elements induced by the coating process.

For example, for a specific coating process, the at least one coating layer 10 of at least one coating element may be thicker at proximity of the optical center of the optical element 8 than in the periphery of the optical element 8. This will result in a coated optical element 8 having an optical power different than its targeted optical power. In such case, the coating lens transfer law will correspond to the transformations to apply to the shape of the surface of the lens element comprising the optical element 8 in order to obtain a coated optical element having an optical power as close as possible to the targeted optical power of the optical element.

Advantageously, the coating lens transfer law may be determined by a method according to another aspect of the disclosure.

The method for determining a lens element according to the disclosure further comprises a step S6 of determining the lens element adapted to the wearer based at least on the lens data and the coating lens transfer law.

Advantageously, determining the lens element based on the lens data and the coating lens transfer law allows tuning the design of the uncovered lens element in order to obtain an accurate treated lens element, for example adapted for a wearer, once covered by the coating layer.

According to an embodiment of the disclosure, the method for determining a lens element may further comprise a step S8 of manufacturing the lens element 2 determined based on the lens data and the coating transfer law associated with a coating process.

Additionally, the method for determining a lens element may further comprise a step S10 of coating at least a zone of the holder and a zone of at least one optical element with at least one coating element based on the coating process.

Furthermore, the method for determining a lens element according to the disclosure may further comprise a step of polymerizing the at least one coating element covering a zone of the holder and a zone of at least one optical element.

The method according to the disclosure may comprise, further to the coating step, a second step of coating at least a zone of the holder and a zone of at least one optical element with at least one coating element based on the coating process.

The at least one coating element used during the second step of coating may be identical to the at least one coating element used during the first step of coating.

The at least one coating element may comprise features selected from the group consisting of anti-scratch, anti-reflection, anti-smudge, anti-dust, UV-filtration, blue light-filtration. Advantageously, the at least one coating element may comprise anti-abrasion features.

The disclosure further relates to a method implemented by computer means for determining a mold for a lens element, for example a lens element.

Figure 3:
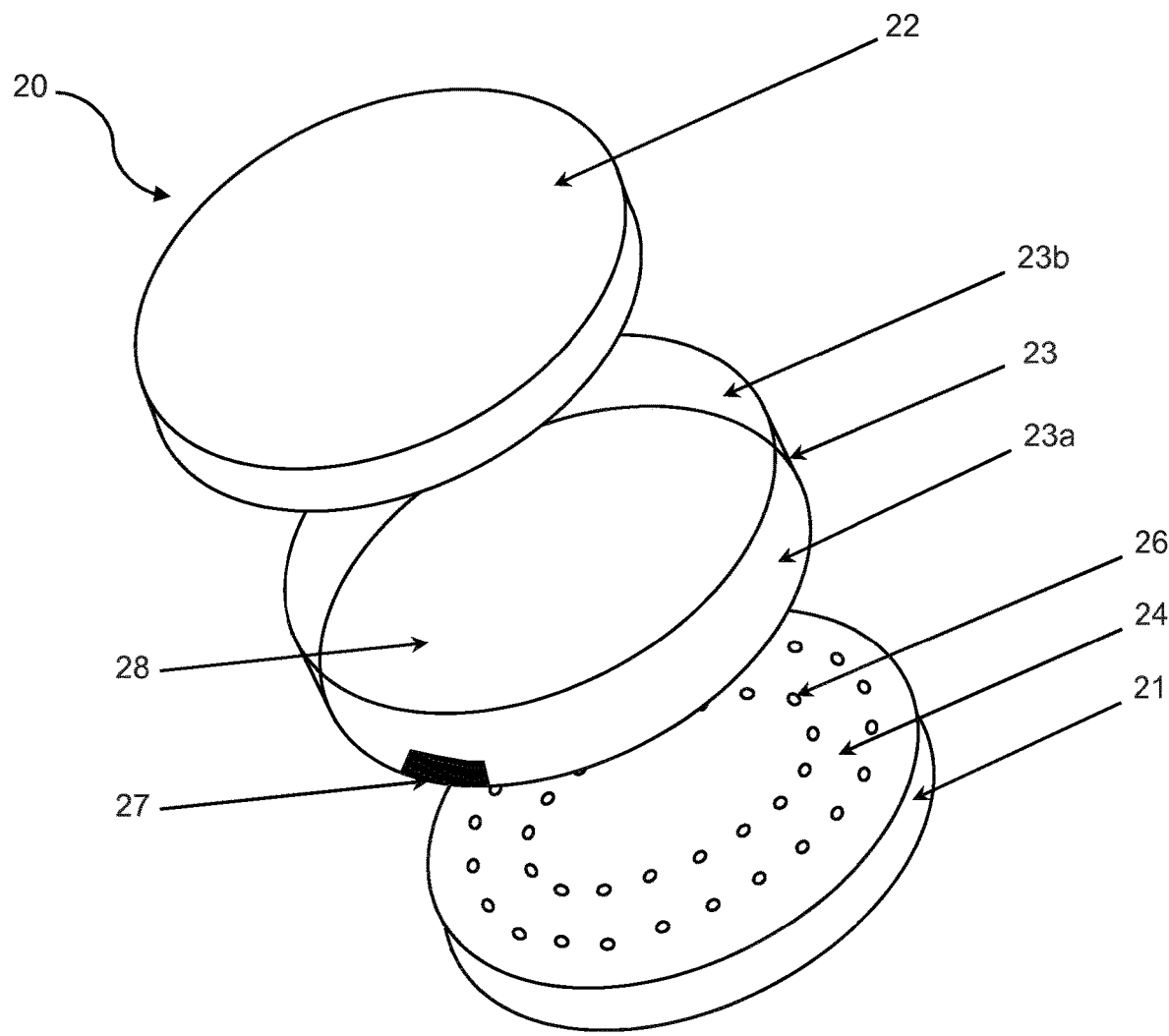
FIG. 3 illustrates an exploded view of a mold for a lens element according to an embodiment of the disclosure.

As illustrated in FIG. 3, the mold 20 for a lens element 2 comprising a plurality of optical elements 8 having a targeted optical function and intended to be covered by at least one layer of at least one coating element 10 according to the disclosure comprises a first molding element 21, a second molding element 22 and a gasket 23.

The first molding element 21 has a first surface 24 having a first surfacic curvature. For example the first surface 24 has a spherical surfacic curvature. Alternatively, the first surface 24 may have an aspherical surfacic curvature and/or a cylindrical surfacic curvature and/or a toric surfacic curvature. The first surface 24 of the first molding element 21 corresponds to the surface of the holder 4 of the lens element 2. For example, the first surface 24 may corresponds to the surface of the holder 4 having an optical function based on a prescription of a wearer.

The first molding element 21 further comprises a plurality of surfacic elements 26 having at least a second surfacic curvature that differs from the first curvature of the first surface 24. For example, the surfacic elements 26 of the first surface 24 of the first molding element 21 may correspond to the optical element 8 of the lens 2.

Part of, preferably all of the plurality of surfacic elements 26 present an axis of symmetry (Di).

The plurality of surfacic elements 26 have a contour shape being inscribable in a circle (C) having a diameter greater than or equal to 0.8 mm and smaller than or equal to 3.0 mm. The circle (C) may be a planar projection of the surface of the surfacic element, for example in a plane orthogonal to the axis of symmetry of the surfacic element.

The axis of symmetry of each surfacic elements 26 may correspond to the center of circle in which each surfacic element is respectively inscribed.

The second surfacic curvature of at least one of the plurality of surfacic elements 26 may be a spherical and/or aspherical and/or cylindrical and/or toric surfacic curvature. The plurality of surfacic elements 26 of the first molding element 21 correspond to the optical elements 8 placed on the hold 4 of the lens element 12.

In the sense of the disclosure, aspherical surfacic elements have a continuous evolution over their surface.

For each surfacic element 26, one may define a central zone and a peripheral zone of the surfacic element. The central zone of the surfacic element corresponds to a circular zone comprised in the circle (C), having the same center as circle (C) and having a radius equal to 0.75 tiles the radius of the circle (C). The peripheral zone of the surfacic element corresponds to the concentric ring of the circle (C) distant by at least 0.75 times the radius of the circle (C).

The mean surfacic curvature of the surfacic element in the central zone of said surfacic element is different from the mean surfacic curvature of the surfacic element in the peripheral zone of said surfacic element. For example, the mean surfacic curvature in the central zone is higher than the mean surfacic curvature in the peripheral zone of said surfacic element. Alternatively, the mean surfacic curvature in the central zone may be lower than the mean surfacic curvature in the peripheral zone of said surfacic element.

Along a section of a surfacic element 26 a section passing through the axis of symmetry (Di) of said surfacic element, the surfacic curvature of the surfacic element increases from the intersection between the axis of symmetry and the surface of the surfacic element to a first point, and decrease from said first point to the periphery of the surfacic element.

At least one, preferably 50%, more preferably more than 80% of the plurality of surfacic elements 26 may have a toric surface. A toric surface is a surface of revolution that can be created by rotating a circle or arc about an axis of revolution (eventually positioned at infinity) that does not pass through its center of curvature. Toric surface elements have two different radial profiles at right angles to each other.

The toric surfacic element may be a pure cylinder, meaning that minimum meridian is zero, while maximum meridian is strictly positive.

According to an embodiment of the disclosure, at least two of the plurality of surfacic elements 26 are non-contiguous. In the sense of the disclosure, two surfacic elements are non-contiguous if for all the paths linking the two surfacic elements one may measure at least along part of each path the first surfacic curvature of the first surface 24 of the first molding element 21.

According to an embodiment of the disclosure, at least two of the plurality of surfacic elements 26 are contiguous. In the sense of the disclosure two surfacic elements are contiguous if for at least one path linking the two surfacic elements one may not measure along said at least one path the first surfacic curvature of the first surface 24 of the first molding element 21.

At least part, for example all of the plurality of surfacic elements 26 may be positioned on a structured network.

According to an embodiment of the disclosure, the disposition of at least part, for example all of the plurality of surfacic elements 26 on the first surface of the first molding element exhibit symmetry of revolution about an axis, for example centered on the geometrical center of the first surface 24 of the first molding element 21. In other words, at least part of the plurality of surfacic element 16 may be regularly distributed along at least one circle centered on the geometrical center of the first surface 24 of the first molding element 21.

According to an embodiment of the disclosure, at least part, for example all of the plurality of surfacic elements 26 are placed on at least a ring on the first surface 24 of the first molding element 21.

The plurality of surfacic elements may further be organized on concentric rings on the first surface of the first molding element. For example, the plurality of surfacic elements 26 are positioned along a set of 11 concentric rings over the entire first surface 24 of the first molding element 21. The concentric rings of surfacic elements may be centered on the geometrical center of the first surface 24 of the first molding element 21.

The mean surfacic curvature of the plurality of surfacic elements 26 may be identical for all the surfacic elements of the same concentric ring. In particular, the mean surfacic curvatures of the central zone of the surfacic elements 26 of the same concentric ring are identical.

According to other embodiments of the disclosure, the plurality of surfacic elements 26 may be organized on different patterns, such as for example square shaped pattern.

The plurality of surfacic elements 26 may be configured so that along at least one section of the first molding element 21, the mean surfacic curvature of the plurality of surfacic elements, for example the mean surfacic curvature of the central zone of the plurality of surfacic elements 26 increases from a point of the section towards the peripheral part of said section.

The plurality of surfacic elements 26 may be configured so that along at least one section of the first molding element 21 passing through a geometric center of the first surface 24 of said first molding element, the mean surfacic curvature of the plurality of surfacic elements 26 increases from said geometric center towards the peripheral part of said section. For example, the mean surfacic curvature of the central zone of the surfacic elements 26 increases along the section passing through the geometric center of the first surface of the first molding element from said geometric center to the periphery. Similarly, the mean surfacic curvature of the peripheral zone of the surfacic elements may increase along the section passing through the geometric center of the first surface of the first molding element from said geometric center to the periphery.

The plurality of surfacic elements 26 may be configured so that along at least one section of the first molding element 21, for example a section passing through the geometric center of the first surface of the first molding element, the mean surfacic curvature of the plurality of surfacic elements 26, for example the mean surfacic curvature of the central zone of the plurality of surfacic element, increases from a first point of said section towards the peripheral part of said section and decreases from a second point of said section towards the peripheral part of said section, the second point being closer to the peripheral part of said section than the first point.

For every circular zone having a radius comprised between 4 and 8 mm comprising a geometrical center of the first surface of the first molding element greater or equal to said radius+5 mm, the ratio between the sum of areas of the plurality of surfacic elements located inside said circular zone and the area of said circular zone is comprised between 20% and 70%.

The mold 20 for the lens element 2 further comprises a second molding element 22. The second molding element 22 has a second surface 25. In FIG. 3, the second surface 25 of the second molding element 22 is not represented as it faces the first surface 24 of the first molding element.

The mold 20 for the lens element 2 further comprises a gasket 23. The gasket 23 has an annular form comprising an inner surface 23a and an outer surface 23b. The gasket 23 further comprises an opening 27.

The gasket 23 seals the first and second molding elements 21 and 22 together to form a molding cavity 28. The molding cavity 28 is defined by the first surface 24 comprising the surfacic elements 26 of the first molding element 21, the second surface 25 of the second molding element 22, and the inner surface 23a of the gasket 23.

The molding cavity 28 of the mold 20 for a lens element 2 is filled with a molding material through the opening 27. Despite being represented in the gasket 23, the opening 27 may alternatively be placed on the first molding element or the second molding element.

For example, the molding material may be a casting material poured into the molding cavity through the opening 27 of the gasket 23. The casting material in the molding cavity is further polymerized into a lens material thereby forming the lens element 2.

Alternatively, the molding material may be a thermoplastic material. The thermo-plastic material which is in a first liquid state at a first temperature is injected into the mold cavity 28 through opening 27. During the cooling process, the thermo-plastic material changes from a first liquid state to a second solid state corresponding to the lens material of lens element 2.

As illustrated on FIG. 5, the method for determining a mold for a lens according to the disclosure comprises a step S12 of providing mold data. The mold data indicates at least an initial shape of the mold for the lens element to be determined.

The initial shape of the mold for a lens element corresponds to a shape of the first surface of the first molding element comprising the plurality of surfacic elements and to the shape of the surface of the plurality of surfacic elements. The shape of the first surface of the first molding element correspond to the shape of the holder of the lens element which is associated with the prescription for correcting the abnormal refraction of the eye of the person. The shape of the surface of plurality of surfacic elements correspond to the shape of the optical elements of the lens element which is associated with a targeted optical function of said optical elements.

The method for determining a mold for a lens element according to the disclosure further comprises a step S14 of providing a coating mold transfer law associated with a coating process of the lens element comprising the optical elements. The coating process is associated with at least one coating element.

The coating process may further relate to the shape of the surface of the lens element bearing the optical elements 8, the shape of the optical elements, a targeted thickness of the at least one coating layer 10 of at least one coating element, and the conditions of application of the at least one coating element.

For example, the conditions of application of the at least one coating element may relate to the withdrawal speed for a dip-coating type process or the rotation speed for spin-coating. The conditions of application may also relate to drying parameters.

The coating mold transfer law corresponds to transformations to apply to the shape of the initial surface of the mold for the lens element for compensating modifications of the targeted optical function of the optical elements induced by the coating process.

For example, for a specific coating process, the at least one coating layer 10 of at least one coating element may be thicker at proximity of the optical center of the optical element 8 than in the periphery of the optical element 8. This will result in a coated optical element 8 having an optical power different than its targeted optical power. In such case, the coating mold transfer law will correspond to the transformations to apply to the shape of the initial first surface 24 of the first molding element 21 comprising the plurality of surfacic elements in order to obtain a coated optical element having an optical power as close as possible to the targeted optical power of the optical element.

Advantageously, the coating mold transfer law may be determined by a method according to another aspect of the disclosure.

The method for determining a mold for a lens element according to the disclosure further comprises a step S16 of determining a shape of the mold for the lens element adapted to the wearer based at least on the mold data and the coating mold transfer law.

Advantageously, determining the mold for the lens element based on the mold data and the coating mold transfer law allows tuning the design of the first surface of the mold and of the surfacic elements to provide an uncovered lens element adapted to become an accurate treated lens element, for example adapted for a wearer, once covered by the coating layer.

According to another embodiment of the disclosure, the method for determining a mold for a lens element comprises prior to the step of determining the shape of the mold, a step S15 of providing a cooling transfer law.

The cooling transfer law is associated with a cooling process of a molded lens element comprising optical elements.

The cooling transfer law corresponds to transformations to apply to the shape of the mold for compensating modifications of a targeted optical function of the optical elements induced by the retraction of the lens element material during the cooling process.

The shape of the mold for a lens element may further be determined based on the mold data, the coating mold transfer law and the cooling transfer law.

The method may further comprises a step S18 of manufacturing the lens element. The lens element may be manufactured by casting a molding material and polymerizing said molding material or by injecting a molding material and cooling said molding material.

The method may further comprises a step S20 of coating the molded lens element based on the coating process.

Another aspect of the disclosure relates to a method implemented by computer means for determining a transfer law associated with a coating process of a lens element.

As represented on FIG. 6, the method for determining a transfer law associated with a coating process of a lens element according to the disclosure comprises:

a step S30*a* of providing a mold for a lens element and a step S30*b* of obtaining a lens element, a step S32 of providing a lens element, a step S34 of coating at least a zone of the holder and at least a zone of the at least one optical element, a step S36 of measuring at least one optical characteristic of the at least one zone of the at least one optical element covered by the coating element, a step S38 of determining at least one optical characteristic error, a step S40 of compiling information corresponding to the determined optical characteristic error, and a step S42 of determining a transfer law.

During step S32, a lens element, for example adapted for a person, is provided.

Alternatively, the method may comprise a step S30*a* of providing a mold for a lens element and a step S30*b* of obtaining a lens element by molding it.

The lens element comprises a holder comprising a refraction area having a first refractive power. For example, the lens element may be adapted for a person and the first refractive power may be based on a prescription for correcting an abnormal refraction of an eye of the person.

The lens element further comprises at least one optical element having at least one targeted optical function and placed on at least one surface of the holder. The targeted optical function of the at least one optical element may be to focus an image in front and/or behind the retina of the wearer so as to prevent or at least slow down a progress of the abnormal refraction of the eye of the person.

During step S34, at least a zone of the holder and at least a zone of at least one optical element is coated with at least one coating element based on a coating process. The coating process is at least associated with the at least one coating element.

The coating process may further relate to a shape of the lens element, a shape of the optical elements, a targeted thickness of the coating layer of at least one coating element, and conditions of the application of the at least one coating element.

According to an embodiment of the disclosure, the method for determining a transfer law associated with a coating process of a lens element may further comprise, further to the coating step, a second step S342 of coating at least a zone of the holder and at least a zone of at least one optical element with at least one coating element based on a coating process. The coating process is associated with the at least one coating element.

The at least one coating element used during the coating step S34 may be identical as the coating element used during the coating step S342. Preferably, the at least one coating element used during the coating step S342 is different from the at least one coating element used during the coating step S34.

The at least one coating element may comprise features selected from the group consisting of anti-scratch, anti-reflection, anti-smudge, anti-dust, UV-filtration, blue light-filtration. Advantageously, the at least one coating element may comprise anti-abrasion features.

The method according to the disclosure may further comprise a step S344 of polymerizing the at least one coating element covering at least a zone of the holder and at least a zone of the at least one optical element.

The method according to the disclosure may further comprise, further to the second coating step S342, a second step of polymerizing the at least one coating element covering at least a zone of the holder and at least a zone of the at least one optical element.

During step S36, at least one optical characteristic of at least a zone of the at least one optical element covered by the coating element is measured. The optical characteristic of a zone of the optical element refers at least to the optical power.

During step S38, at least one optical characteristic error is determined based on the comparison of the measured at least one optical characteristic of the coated optical element and the at least one targeted optical function.

During step S40, information corresponding to the determined optical characteristic error is compiled into a database as correction information.

During step S42, a transfer law associated with the at least one coating process and the at least one optical element is determined based on the correction information of the database.

The transfer law may be a coating lens transfer law used to correct an original shape of the surface of the lens element comprising the at least one optical element so that once coated by the at least one coating element, said at least one coated optical element reaches a targeted optical function.

Alternatively, the transfer law may be a coating mold transfer law used to correct an original shape of a surface of the mold for a lens element comprising at least one surfacic element corresponding to the at least one optical element so that once molded and coated by the at least one coating element, the at least one coated optical element of the molded and coated lens reaches a targeted optical function.

According to an embodiment of the disclosure, the method for determining a to transfer law associated with a coating process of a lens element may comprise a step of providing a lens element S32, a step of coating the lens element S24, a step of measuring optical characteristics S26, a step of determining an optical characteristic error S26, and a step of determining a transfer law based on the determined optical characteristics error, and wherein the steps are repeated until the most adapted transfer law is determined. The most adapted transfer law corresponds to the transfer law for which the modifications of the lens element characteristics induced by the coating layer are best compensated.

Another aspect of the disclosure relates to a lens element, for example adapted for a wearer, the lens element comprising a holder 4 having a refraction area 6, a plurality of optical elements 8 placed on at least one surface of said holder, and at least one coating layer 10 of at least one coating element covering at least a zone of at least an optical element 8 and at least a zone of the holder 4 on which the optical element are placed.

The at least one layer 10 of at least one coating element adds an optical power of 0.1 diopter in absolute value in specific wearing conditions when measured over a zone of the optical element covered by said layer of said coating element.

In other words, when the abnormal refraction of the eye of the person corresponds to myopia, the at least one layer 10 of at least one coating element increases the optical power over a zone of the optical element covered by said coating layer by 0.1 diopter in absolute value in specific wearing conditions.

When the abnormal refraction of the eye of the person corresponds to hypermetropia, the at least one layer 10 of at least one coating element reduces the optical power over a zone of the optical element covered by said coating layer by 0.1 diopter in specific wearing conditions.

Advantageously, having the at least one layer of at least one coating element participating to the optical power of the optical element allows obtaining a lens element comprising coated optical elements with a specific targeted optical function as well as specific treatments. In other words, the at least one layer of at least one coating element participates to the optical function of the coated optical element while providing specific features associated with the coating process of a treatment.

The specific wearing condition may be standard wearing conditions.

The specific wearing condition may be personalized wearing conditions that are measured on the wearer when the wearer wears a spectacle frame he/she chose.

The wearing conditions are to be understood as the position of the lens element with relation to the eye of a wearer, for example defined by a pantoscopic angle, a Cornea to lens distance, a Pupil-cornea distance, a center of rotation of the eye (CRE) to pupil distance, a CRE to lens distance and a wrap angle.

The Cornea to lens distance is the distance along the visual axis of the eye in the primary position (usually taken to be the horizontal) between the cornea and the back surface of the lens; for example equal to 12 mm.

The Pupil-cornea distance is the distance along the visual axis of the eye between its pupil and cornea; usually equal to 2 mm.

The CRE to pupil distance is the distance along the visual axis of the eye between its center of rotation (CRE) and cornea; for example equal to 11.5 mm.

The CRE to lens distance is the distance along the visual axis of the eye in the primary position (usually taken to be the horizontal) between the CRE of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to 8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of standard wearer condition may be defined by a pantoscopic angle of 8°, a Cornea to lens distance of 12 mm, a Pupil-cornea distance of 2 mm, a CRE to pupil distance of 11.5 mm, a CRE to lens distance of 25.5 mm and a wrap angle of 0°.

According to an embodiment of the disclosure, for at least one coated optical elements, the thickness of the at least one coating layer 10 of at least one coating element varies over the surface of the said optical element.

Figure 7:
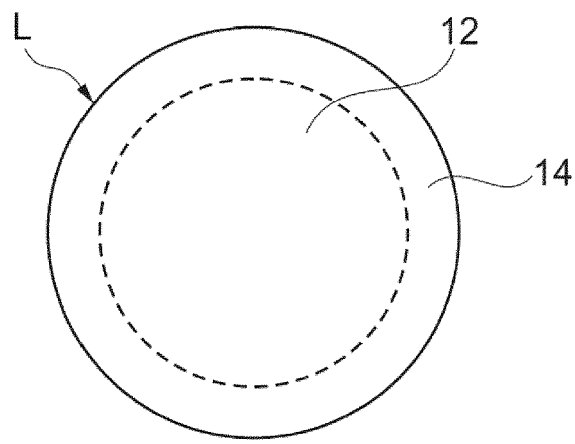
FIG. 7 illustrates a close up plan view of a coated optical element of the lens element according to an embodiment of the disclosure.

For each point of the lens element 2, the thickness of the coating layer 10 of an abrasion resistant element corresponds to the length of the line orthogonal to the surface of the lens element at said specific point of said surface and passing through the at least one coating layer 10 of at least one coating element In the sense of the disclosure, the coated optical elements corresponds to the optical elements covered by the at least one coating layer 10 of at least one coating element As represented on FIG. 7, the coated optical elements have a contour shape being inscribable in a circle L, the circle L representing the surface of said coated optical element. The center 12 of the coated optical element is to be understood as a zone comprised in the circle L, having the same center as said circle L and a radius equal to 0.75 times the radius of the circle L. The periphery 14 of the coated optical elements is to be understood as the concentric ring of the circle L distant by at least 0.75 times the radius of surface of the coated optical element.

Figure 8A:
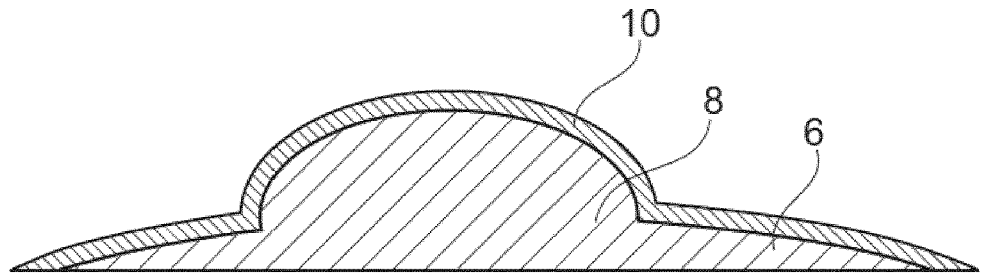
FIGS. 8A, 8B and 8C illustrate different close up profile views of an optical element of the lens element according to an embodiment of the disclosure.

FIG. 8A illustrates a coated optical element covered by a uniform layer of at least one coating element.

Figure 8B:
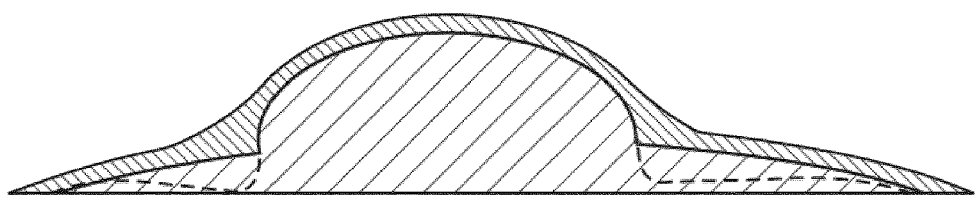

As represented on FIG. 8B, the at least one coating layer 10 of at least one coating element may be thicker in the periphery of the surface of a coated optical element than in the optical center of said coated optical element.

Figure 8C:
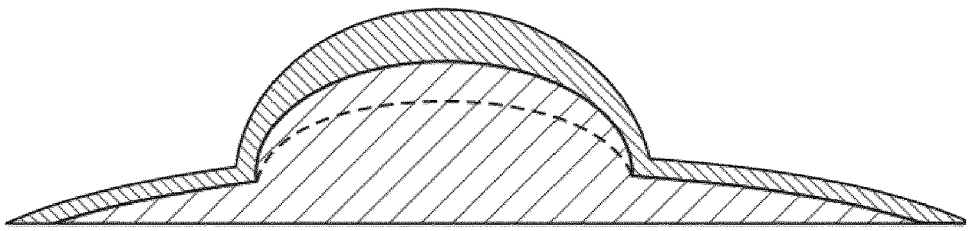

As represented on FIG. 8C, the at least one coating layer 10 of at least one coating element may be thicker in the center of the surface of a coated optical element than at the edge of the surface of said coated optical element.

With reference to FIGS. 8B and 8C, the dotted lines represents the modifications to apply to the shape of the optical element to compensate the modification of the targeted optical function of said optical element induced by the coating process. This result in a coating element having a non-uniform thickness over said optical element.

Figure 9:
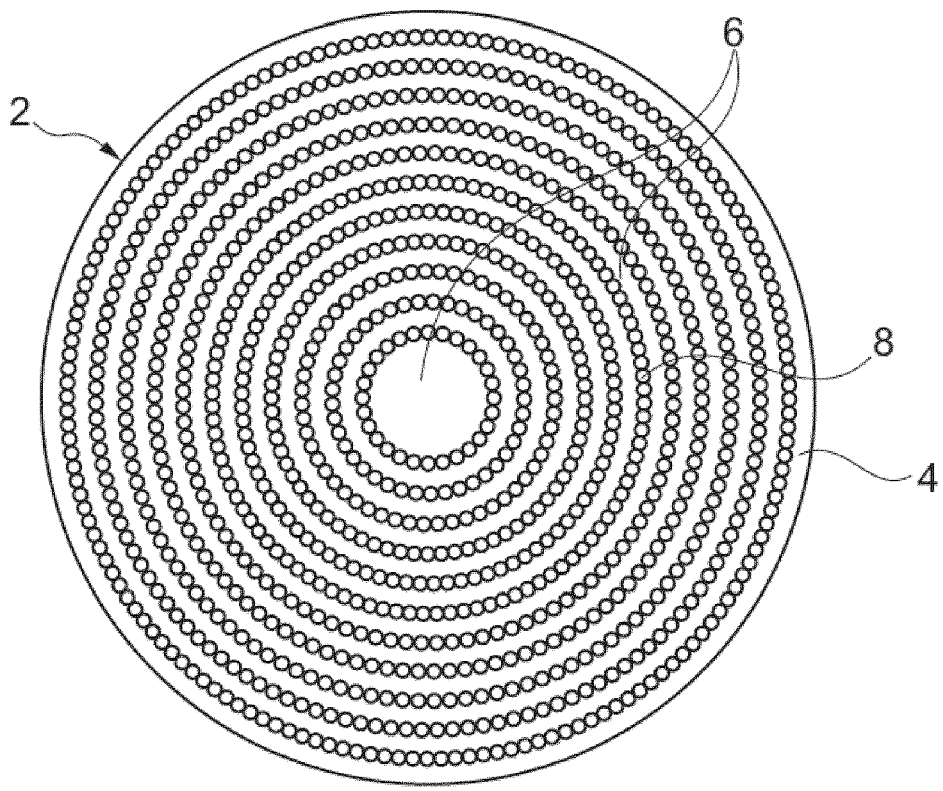
FIG. 9 illustrates a plan view of a lens element according to an embodiment of the disclosure.

The optical elements 8 may be as represented on FIGS. 1, 2 and 9, non-contiguous optical elements.

In the sense of the disclosure, two optical elements are non-contiguous if for all the paths linking the two optical elements one may measure at least along part of each path the refractive power based on a prescription for the eye of the person.

According to an embodiment of the disclosure, at least part of the plurality of optical elements are placed on at least a ring on the at least one surface of the lens element.

According to another embodiment of the disclosure, the plurality of optical elements are organized on concentric rings on the at least one surface of the lens element 2.

With reference to FIG. 9, the plurality of coated optical elements are positioned along a set of 11 concentric rings over the entire surface of the lens element.

According to other embodiments of the disclosure, the plurality of optical elements may be organized on different patterns, such as for example square shaped pattern.

According to an embodiment of the disclosure, the mean sphere of all the coated elements 8 placed on a ring is identical. In the sense of the disclosure, the term "identical" is to be understood as being within a range of more or less 5% of the value.

Although being part of the technical knowledge of a person skilled in the art, reference is made to the definition of mean sphere disclosed in WO 2016/146590.

According to another embodiment of the disclosure, the mean sphere of at least part of the coated optical elements varies according to the optical element location on the lens element, more specifically according to the distance of the optical element from the geometrical center of the lens element.

According to an embodiment of the disclosure, the mean sphere of at least part of the coated optical element increases from the center to the edge of the lens element.

According to an embodiment of the disclosure, the mean sphere of at least part of the coated optical element decreases from the center to the edge of the lens element.

According to another embodiment of the disclosure, the mean sphere of at least part of the coated optical element increases from the center to the edge of the lens element.

Figure 10:
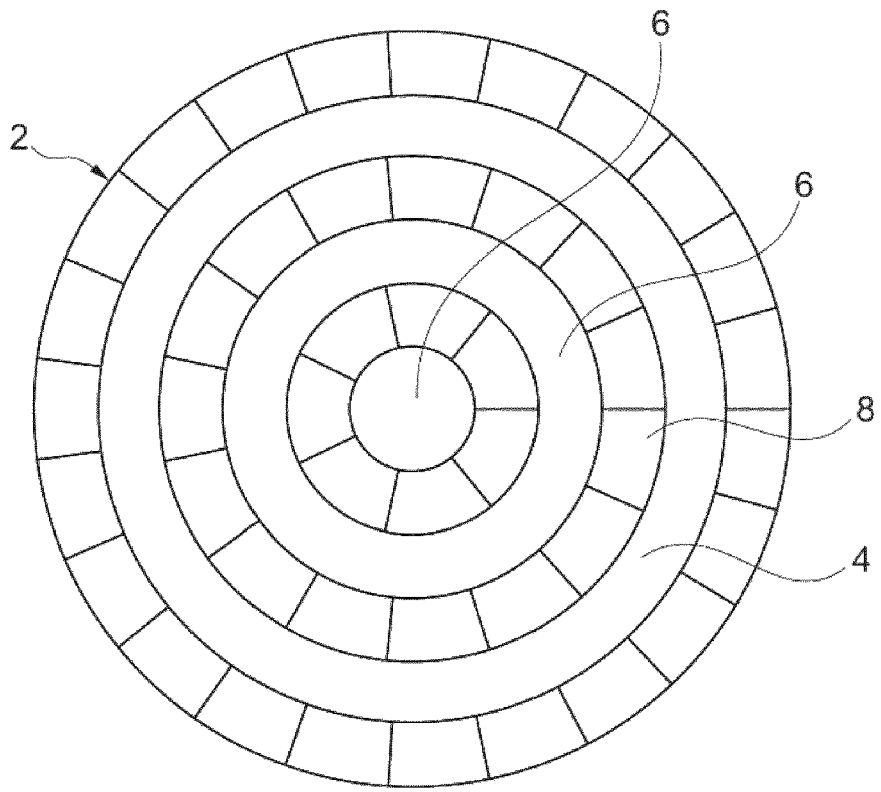
FIG. 10 illustrates a plan view of a lens element according to an embodiment of the disclosure.

According to an embodiment of the disclosure illustrated on FIG. 10, the coated optical elements are contiguous.

In the sense of the disclosure two optical elements are contiguous if for at least one path linking the two optical elements one may not measure along said at least one path the refractive power based on a prescription for the eye of the person.

Advantageously, each of these configurations of coated optical elements allows providing a balance between slowing down the progression of the abnormal refraction of the eye of a person and maintaining acceptable vision performance and/or wearing comfort of said person.

The disclosure has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the disclosure, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the disclosure.

The invention claimed is:
1. A method implemented by computer means for determining a lens element, the lens element comprising:
- a holder comprising a refraction area having a refractive power based on a prescription for correcting an abnormal refraction of an eye of the person;
- a plurality of optical elements placed on at least one surface of the holder so as to at least one of slow down, retard or prevent a progress of the abnormal refraction of the eye of the person; and
- at least one layer of at least one coating element covering at least a zone of at least one optical elements and at least a zone of the holder on which the optical elements are placed, wherein the method comprises:
- providing lens data, the lens data indicating at least a shape of the lens element to be determined, the shape of the lens element corresponding to a shape of the holder and to at least a shape of the optical elements of the lens element, the shape of the optical elements being associated with a targeted optical function;
- providing a coating lens transfer law associated with a coating process of the lens element comprising the optical elements, the coating process being associated with the coating element, the coating lens transfer law corresponding to transformations to apply to the shape of the surface of the lens element comprising the optical elements for compensating modifications of the targeted optical function of the optical elements induced by the coating process; and
- determining the lens element based at least on the lens data and the coating lens transfer law.

* * * * *